US007430226B2

United States Patent
Liu

(10) Patent No.: US 7,430,226 B2
(45) Date of Patent: Sep. 30, 2008

(54) DISPERSION MANAGED FIBER STRETCHER FOR HIGH-ENERGY SHORT PULSE FEMOTOSECOND FIBER LASER SYSTEM

(75) Inventor: Jian Liu, Sunnyvale, CA (US)

(73) Assignee: Polar Onyx, Inc., Sunnyvale, CA (US)

( * ) Notice: Subject to any disclaimer, the term of this patent is extended or adjusted under 35 U.S.C. 154(b) by 0 days.

(21) Appl. No.: 11/715,240

(22) Filed: Mar. 6, 2007

(65) Prior Publication Data

US 2007/0206647 A1   Sep. 6, 2007

Related U.S. Application Data

(60) Provisional application No. 60/781,434, filed on Mar. 6, 2006.

(51) Int. Cl.
*H01S 3/30* (2006.01)
*H01S 3/098* (2006.01)
*H01S 3/10* (2006.01)

(52) U.S. Cl. .............. 372/6; 372/18; 372/21; 372/25

(58) Field of Classification Search .............. 372/6, 372/9, 18, 21, 25, 30
See application file for complete search history.

*Primary Examiner*—Armando Rodriguez
(74) *Attorney, Agent, or Firm*—Xin Wen

(57) ABSTRACT

A fiber Chirped Pulse Amplification (CPA) laser system that includes a fiber mode-locking oscillator for generating a seed laser for projecting to a stretcher for generated a pulse-stretched laser for projecting to a multiple stage amplifier. The multiple stage amplifier further amplifying said laser for projecting to a compressor for compressing said laser to generate an output laser of an original pulse width. In this invention, pulse stretcher is implemented with a special dispersion management fiber that has a flat dispersion or a negative TOD (dispersion slope, or a slope of dispersion versus wavelength).

26 Claims, 3 Drawing Sheets functional block diagram of a Fiber Laser System

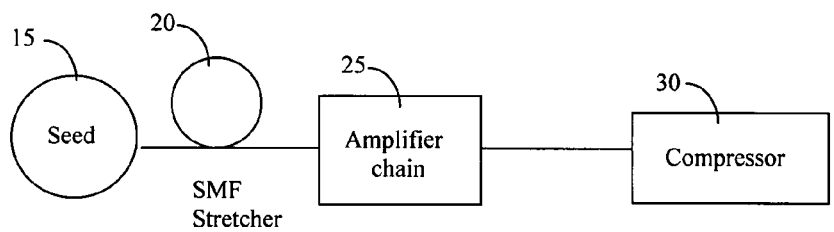
Fig. 1 functional block diagram of a Fiber Laser System
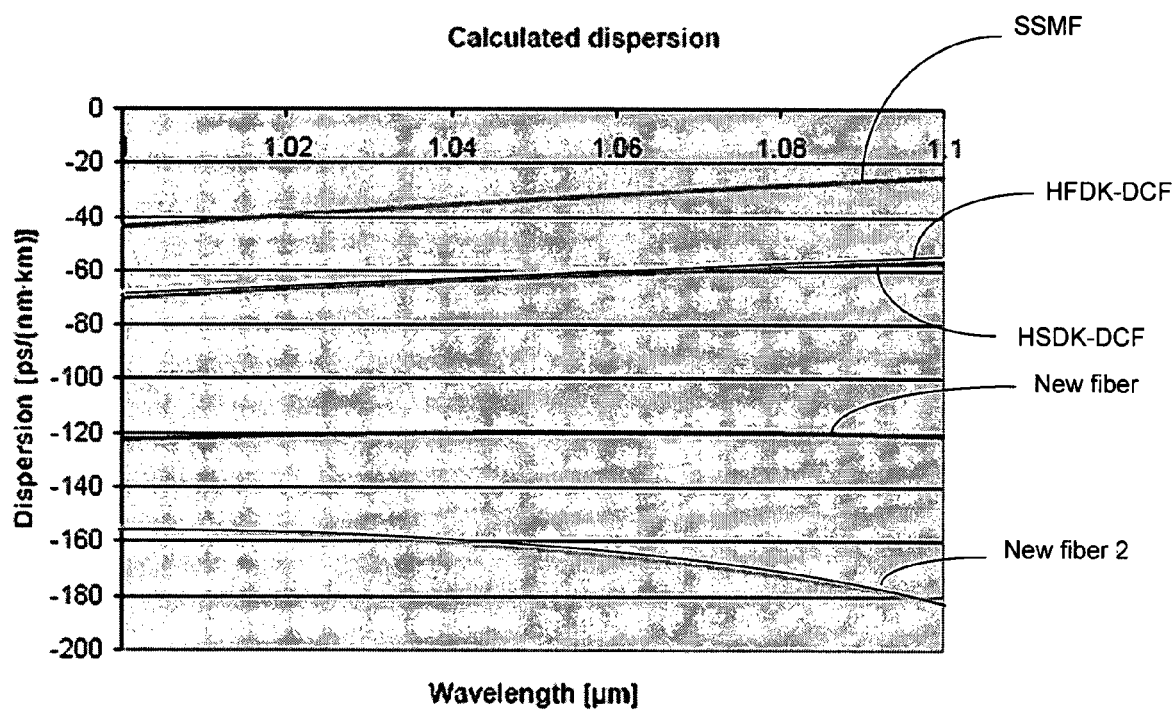
Fig. 2

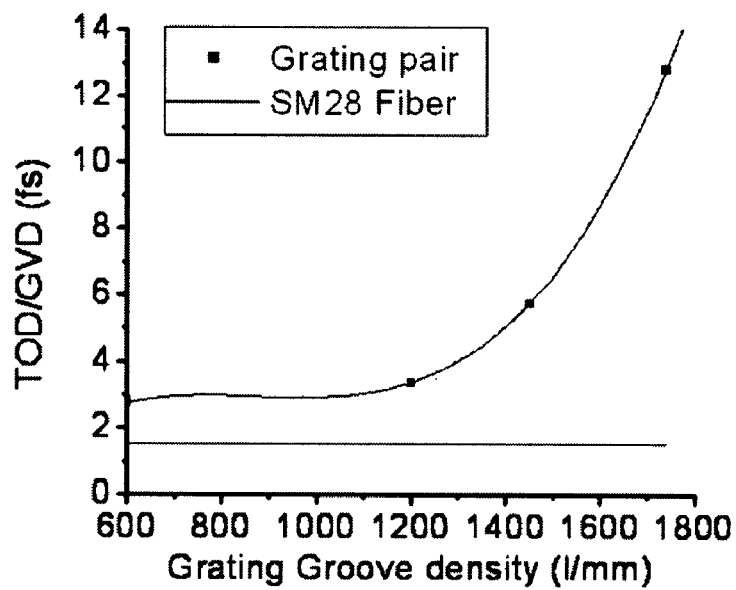
Fig. 3 TOD of gratings as a function of groove density
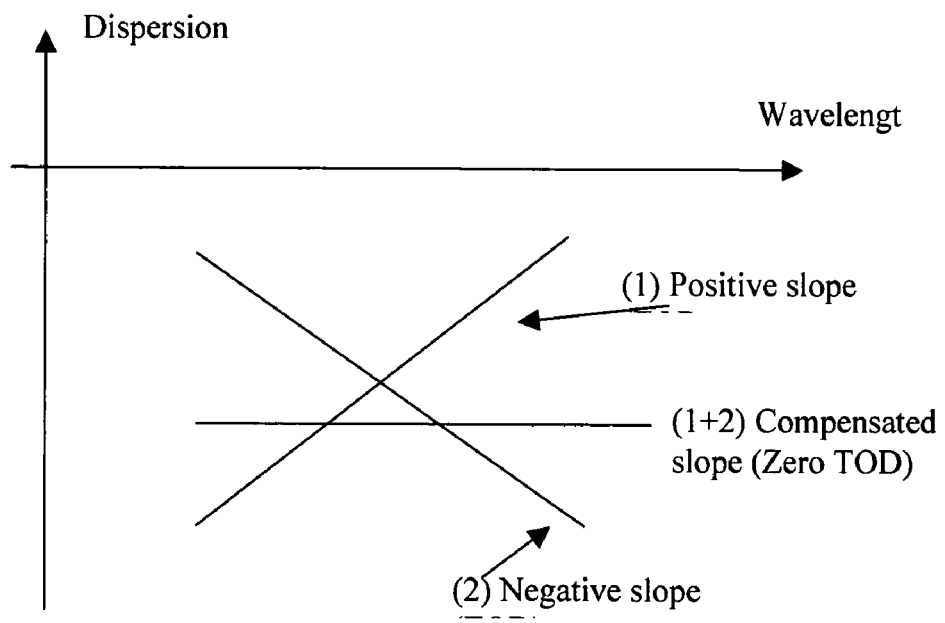
Fig. 4 Schematic diagram for showing TOD compensation

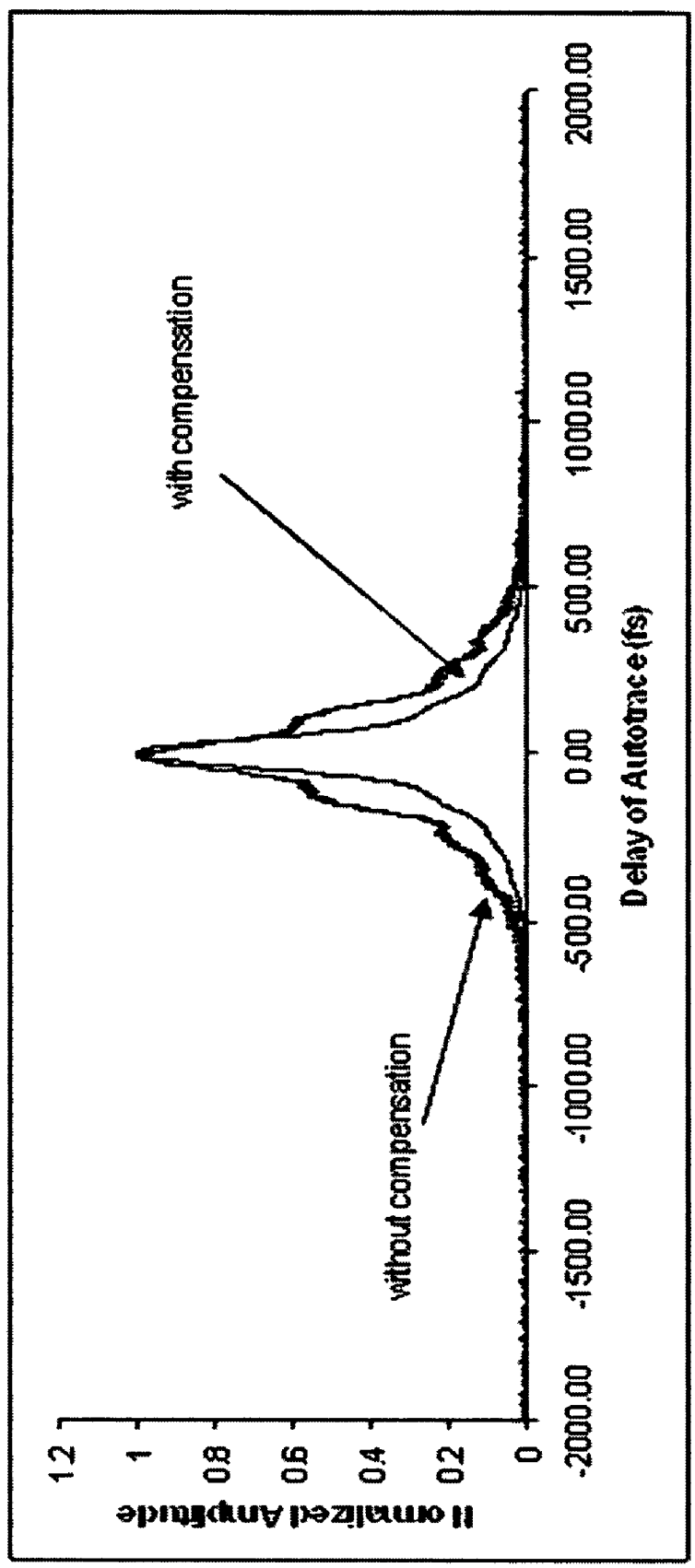
Fig. 5 Experiment comparison between with and without TOD compensation

DISPERSION MANAGED FIBER STRETCHER FOR HIGH-ENERGY SHORT PULSE FEMOTOSECOND FIBER LASER SYSTEM

This Formal Application claims a Priority Date of Mar. 6, 2006 benefit from a Provisional Patent Applications 60/781,434 filed by the same Inventor of this Application. The disclosures made in 60/781,434 are hereby incorporated by reference in this Patent Application.

FIELD OF THE INVENTION

The present invention relates generally to apparatuses and methods for providing fiber laser system. More particularly, this invention relates a system configuration implemented with pulse stretching management for dispersion compensation for providing a practical approach to provide a femtosecond fiber laser with one mJ level of energy.

BACKGROUND OF THE INVENTION

Even though current technologies of fiber laser have made significant progress toward achieving a compact and reliable fiber laser system providing high quality output laser with ever increasing output energy, however those of ordinary skill in the art are still confronted with technical limitations and difficulties. Specifically, in a fiber laser system implemented with the Chirped Pulse Amplification (CPA) for short pulse high power laser amplifier, the fiber laser systems are still limited by the technical difficulties that 1 mJ high energy femtosecond fiber laser requires multiple improvements in terms of fiber design, high power amplification, nonlinear effects mitigation, and stretching and compression operations. There is a first challenge of the nonlinear effects. When the peak power goes up to 100 kW, strong nonlinear effects such as self phase modulation (SPM) and stimulated Raman scattering (SRS) cause more serious problems in depleting signal power in the high power fiber laser, even though a large mode area (LMA) fiber be used to reduce SRS/SPM and increase saturation power. Then, there is another challenge of a third order dispersion (TOD), i.e., the dispersion slope, or the slope of dispersion versus wavelength. Due to a higher stretching ratio involves in the chirped pulse amplification, higher order dispersion such as TOD has significant impact on the pulse quality and the pulse faces a challenge to compress efficiently below 200 fs after amplification. Thus the third order dispersion (TOD) limits the scalability of the laser systems.

There are additional difficulties in power extraction when the Yb-fibers are implemented due to the low extraction of the power output from the fiber. Higher doping concentrations are required for use in the fiber laser in order to overcome such difficulties. Furthermore, a long compression stage is required due to the longer stretched pulses at 1 to 10 ns pulse-width and that increases the size and costs of such laser systems. All these challenges require new and improved fiber laser systems to reliably and practically generate the femtosecond laser at an energy level substantially near a one-mJ level.

Therefore, a need still exists in the art of fiber laser design and manufacture to provide a new and improved configuration and method to provide fiber laser to compensate the dispersion generated in the laser system due to the TOD effects such that the above-discussed difficulty may be resolved.

SUMMARY OF THE PRESENT INVENTION

It is therefore an aspect of the present invention to provide a short pulse fiber laser amplification system by implement a pulse stretcher with a special dispersion management fiber that has a flat dispersion or a negative dispersion slope such that by managing the dispersions the above-discussed difficulties as that encountered in the prior art may be resolved.

Specifically, it is an aspect of the present invention that a pulse stretcher is implemented with a fiber of flat dispersion over the spectral range of 1060 nm or a negative dispersion slope over the range of 1020-1090 nm by using a depressed cladding structure.

Another aspect of this invention is to implement a stretcher with fibers of different dispersion and dispersion slopes depending on the requirements of managing or compensating the TOD. The fiber implemented in the stretcher may include a negative dispersion slop about twice that of SM-28 or using a SSMF, corning fiber and dispersion compensation fiber HSDK supplied by OFS Denmark to achiever various dispersions and dispersion slopes in tailing the dispersion for particular requirements of managing and compensation the TOD or dispersions of higher orders in a laser system.

Briefly, in a preferred embodiment, the present invention discloses a fiber Chirped Pulse Amplification (CPA) laser system that includes a fiber mode-locking oscillator for generating a seed laser for projecting to a stretcher for generated a pulse-stretched laser for projecting to a multiple stage amplifier. The multiple stage amplifier further amplifying said laser for projecting to a compressor for compressing said laser to generate an output laser of an original pulse width. In this invention, pulse stretcher is implemented with a special dispersion management fiber that has a flat dispersion or a negative TOD (dispersion slope, or a slope of dispersion versus wavelength).

In a preferred embodiment, this invention further discloses a method for configuring a fiber Chirped Pulse Amplification (CPA) laser system includes a step of generating a seed laser from fiber mode-locking oscillator for projecting to a fiber stretcher for stretching a pulse width of the laser wherein the stretcher further comprising a special dispersion management fiber that has a flat dispersion or a negative slope of dispersion versus wavelength.

These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 1 is a functional block diagram for showing a fiber laser system implemented with pulse stretcher having a special dispersion management fiber that has a flat dispersion or a negative dispersion of this invention.

FIG. 2 is a fiber dispersion index profile over range of laser wavelengths for different types of fibers that may be implemented in the pulse stretcher of this invention for dispersion management and compensation.

FIG. 3 is a diagram of TOD grating as function of groove density.

FIG. 4 is a schematic diagram for illustrating the TOD compensation.

FIG. 5 shows curves for illustrating the pulse-shape improvement with TOD compensation accomplished by the new fibers implemented in this invention.

DETAILED DESCRIPTION OF THE INVENTION

Referring to FIG. 1 for a schematic diagram of a short pulse high-energy fiber laser system that includes a laser seed 15 having an oscillator for generating a fiber-based mode-locking laser with original pulse duration. The laser project from the oscillator of the seed laser 15 is projected into a laser stretcher 20 to stretch the laser pulse of this invention. The stretcher 20 chirps laser pulse with stretched pulse width is projected into a series of laser amplifiers 25 to amplify the laser into higher energy. The amplified laser is then projected into a pulse compressor 30 to re-compress the pulse width of the laser to output a laser with original pulse width. The pulse stretcher is implemented with a special dispersion management fiber that has a flat dispersion or a negative slope of dispersion versus wavelength.

FIG. 2 is a diagram for illustrating the fiber dispersion index profile at different wavelength that may be implemented in the stretcher 20 of FIG. 1. In an exemplary embodiment, it is possible that a fiber with a flat dispersion may be implemented as a new fiber for the stretcher at a 1060 nm spectral band. Alternately, the stretcher may be implemented with a fiber of a negative dispersion slope over the range of 1020-1090 nm by using a depressed cladding structure. Depending on the laser design in managing/compensating TOD with the nonlinear effects through the self phase modulation (SPM), fibers with various dispersion and dispersion slope can be designed. According to FIG. 2, a fiber as a first new fiber embodiment of this invention, i.e., a new fiber 1, has a flat dispersion over the spectral range of 1060 nm or another fiber as a second new fiber embodiment of this invention, e.g., a new fiber 2, has a negative dispersion slope, about twice that of SM 28, may be implemented. Moreover, due to the negative dispersion properties, the fiber with negative dispersion slope can be used with other types of commercial fibers such as SM 28 (SSMF, corning) and dispersion compensation fiber HSDK (OFS, Denmark) to achieve various dispersions and dispersion slopes in tailoring the dispersion of the fiber laser.

Referring to FIG. 3 as an example for illustrating the reason for managing the dispersion and slope to resolve the TOD effects that typically generated from a compressor implemented with a grating pair. Compared with a SM28 fiber, the TOD is about at least twice larger than that of SM 28. This amount of TOD must be compensated by a fiber with a negative dispersion slope (TOD) such as the fiber with a negative dispersion slope twice that of SM 28.

A dispersion slope is defined as the dispersion change divided by the wavelength change (or differential change of the dispersion over a given wavelength change). To show how to compensate the TOD of one component, e.g. fiber or grating, FIG. 4 illustrates the improvements as illustrated by line "(1+2) compensated slope", accomplished by the compensation when a laser system is implemented with the special dispersion management fiber that either has a negative slope of dispersion indicated as line 2 in the FIG. 4.

An experiment has been done for a 10 micro-Joule high-energy fs fiber laser system operating at 1030 nm in comparison between SM 28 fiber stretcher and a new fiber according to the second new fiber embodiment of this invention, e.g., a new fiber 2 shown in FIG. 2 that has a negative dispersion slope about twice that of SM 28. It shows that about 40% pulse reduction has been improved. FIG. 5 gives the pulse width results.

This invention discloses an ultra-fast fiber laser system that includes a dispersion managed fiber stretcher in order to compensate a TOD (dispersion slope, or a slope of dispersion versus wavelength) of a grating compressor or in a regular fiber. In an exemplary embodiment, the dispersion managed fiber stretcher comprising fibers having a refractive index profile different from a conventional fiber., for example a depressed cladding structure. In another exemplary embodiment, the dispersion managed fiber stretcher comprising a fiber of a flat dispersion. In another exemplary embodiment, the dispersion managed fiber stretcher comprising a fiber of a negative TOD (dispersion slope, or a slope of dispersion versus wavelength). In another exemplary embodiment, the dispersion managed fiber stretcher comprising a fiber of a design for managing/compensating a TOD with nonlinear effects through a self phase modulation (SPM) for providing different dispersions and dispersion slopes according to the TOD in the ultra-fast fiber laser system. In another exemplary embodiment, the dispersion managed fiber stretcher comprising a fiber of a negative TOD (dispersion slope, or a slope of dispersion versus wavelength) about twice of a SM 28 fiber. In another exemplary embodiment, the ultra-fast laser system operates at 1 µm region (1030-1100 nm). In another exemplary embodiment, the ultra-fast laser system generates a laser with a pulse width from 10 ps to 10 fs. In another exemplary embodiment, the dispersion managed fiber stretcher includes a fiber of a SSMF Corning fiber. In another exemplary embodiment, the dispersion managed fiber stretcher includes a fiber of a HSDK fiber.

Therefore, according to above descriptions and drawings, this invention discloses a fiber laser system that includes a dispersion-managed stretcher to chirp a laser pulse wherein the dispersion-managed stretcher further comprising a fiber having a flat dispersion. Furthermore, in an alternate embodiment, this invention discloses a fiber laser system that includes a dispersion-managed stretcher to chirp a laser pulse wherein the dispersion-managed stretcher further comprising a fiber having a negative TOD (dispersion slope, or a slope of dispersion versus wavelength). This invention also discloses a method for generating a laser by a fiber laser system that includes a step of chirping a laser pulse by a dispersion managed stretcher by implementing a fiber with a flat dispersion in the dispersion managed stretcher. In an alternate embodiment, this invention also discloses a method for generating a laser by a fiber laser system that includes a step of chirping a laser pulse by a dispersion-managed stretcher by implementing a fiber with a negative TOD (dispersion slope, or a slope of dispersion versus wavelength) in the dispersion managed stretcher.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A fiber-based Chirped Pulse Amplification (CPA) laser system, comprising:
   a seed laser configured to generate a first laser pulses;
   a fiber-based stretcher configured to produce a stretched laser pulse longer than the first laser pulse, wherein the fiber-based stretcher has a first optical dispersion that varies as a function of wavelength in a first direction;
   a fiber-based amplifier configured to produce an amplified pulse in response to the stretched laser pulse; and
   a compressor configured to compress the amplified pulse to produce an output laser pulse shorter than the amplified pulse, wherein the compressor has a second optical dispersion that varies as a function of wavelength in an opposite to the first direction.

2. The fiber-based CPA laser system of claim 1, wherein the second optical dispersion substantially compensates the first optical dispersion, wherein the fiber-based stretcher and the compressor in combination produce a combined optical dispersion that is substantially unchanged in a predetermined wavelength range.

3. The fiber-based CPA laser System of claim 1, wherein the first optical dispersion decreases as a function of wavelengh in a predetermined wavelength range, wherein the second optical dispersion increases as a function of wavelength in a predetermined wavelength range.

4. The fiber-based CPA laser system of claim 1, wherein the first optical dispersion decreases as a function of wavelength in the wavelength range of 1000 nm and 1100 nm.

5. The fiber-based CPA laser system of claim 1, wherein the first optical dispersion is characterized by a third order dispersion (TOD) in the fiber-based stretcher, wherein the second optical dispersion is characterized by a TOD in the compressor.

6. The fiber-based CPA laser system of claim 1, wherein the output laser pulse has a pulse width from about 10 femtoseconds to about 10 picoseconds.

7. The fiber-based CPA laser system of claim 1, wherein the output laser pulse has a pulse energy between 1 nJ and 1 mj.

8. The fiber-based CPA laser system of claim 1, wherein the seed laser comprises a fiber-based mode-locking oscillator configured to generate the first laser pulse.

9. The fiber-based CPA laser system of claim 1, wherein the compressor is based on an optical fiber, a fiber grating, or a bulk grating pair.

10. The fiber-based CPA laser system of claim 1, wherein the fiber-based stretcher comprises a depressed cladding structure.

11. A fiber-based Chirped Pulse Amplification (CPA) laser system, comprising:
   a fiber-based mode-locking oscillator configured to generate a first laser pulses;
   a fiber-based stretcher configured to produce a stretched laser pulse longer than the first laser pulse, wherein the fiber-based stretcher has a first optical dispersion that varies as a function of wavelength in a first direction, wherein the first optical dispersion is characterized by a third order dispersion (TOD) in the fiber-based stretcher;
   a fiber-based multi-stage amplifier configured to produce an amplified pulse in response to the stretched laser pulse; and
   a compressor configured to compress the amplified pulse to produce an output laser pulse shorter than the amplified pulse, wherein the compressor has a second optical dispersion that varies as a function of wavelength in an opposite to the first direction, wherein the second optical dispersion is characterized by a TOD in the compressor.

12. The fiber-based CPA laser system of claim 11, wherein the second optical dispersion substantially compensates the first optical dispersion, wherein the fiber-based stretcher and the compressor in combination produce a combined optical dispersion that is substantially unchanged in a predetermined wavelength range.

13. The fiber-based CPA laser system of claim 11, wherein the first optical dispersion decreases as a function of waveleneth in a predetermined wavelength range, wherein the second optical dispersion increases as a function of wavelength in a predetermined wavelength range.

14. The fiber-based CPA laser system of claim 11, wherein the first optical dispersion decreases as a function of wavelength in the wavelength range of 1000 nm and 1100 nm.

15. The fiber-based CPA laser system of claim 11, wherein the output laser pulse has a pulse width from about 10 femtoseconds to about 10 picoseconds.

16. The fiber-based CPA laser system of claim 11, wherein the output laser pulse has a pulse energy between 1 nJ and 1 mJ.

17. The fiber-based CPA laser system of claim 11, wherein the compressor is based on an optical fiber, a fiber grating, or a bulk grating pair.

18. The fiber-based CPA laser system of claim 11, wherein the fiber-based stretcher comprises a depressed cladding structure.

19. A method for producing a laser pulse, comprising:
   generating a first laser pulses using a fiber-based mode-locking oscillator;
   producing a stretched laser pulse longer than the first laser pulse using a fiber-based stretcher that has a first optical dispersion that varies as a function of wavelength in a first direction, wherein the first optical dispersion is characterized by a third order dispersion (TOD) in the fiber-based stretcher;
   producing an amplified pulse using a fiber-based amplifier in response to the stretched laser pulse; and
   using a compressor to compress the amplified pulse to produce an output laser pulse shorter than the amplified pulse, wherein the compressor has a second optical dispersion that varies as a function of wavelength in an opposite to the first direction, wherein the second optical dispersion is characterized by a TOD in the compressor.

20. The method of claim 19, wherein the second optical dispersion substantially compensates the first optical dispersion, wherein the fiber-based stretcher and the compressor in combination produce a combined optical dispersion that is substantially unchanged in a predetermined wavelength range.

21. The method of claim 19, wherein the first optical dispersion decreases as a function of wavelength in a predetermined wavelength range, wherein the second optical dispersion increases as a function of wavelength in a predetermined wavelength range.

22. The method of claim 19, wherein the first optical dispersion decreases as a function of wavelength in the wavelength range of 1000 nm and 1100 nm.

23. The method of claim 19, wherein the output laser pulse has a pulse width from about 10 femtoseconds to about 10 picoseconds.

24. The method of claim 19, wherein the output laser pulse has a pulse energy between 1 nJ and 1 mJ.

25. The fiber-based CPA laser system of claim 19, wherein the compressor is based on an optical fiber, a fiber grating, or a bulk grating pair.

26. The fiber-based CPA laser system of claim 19, wherein the fiber-based stretcher comprises a depressed cladding structure.

* * * * *